United States Patent Office 3,370,358
Patented Feb. 27, 1968

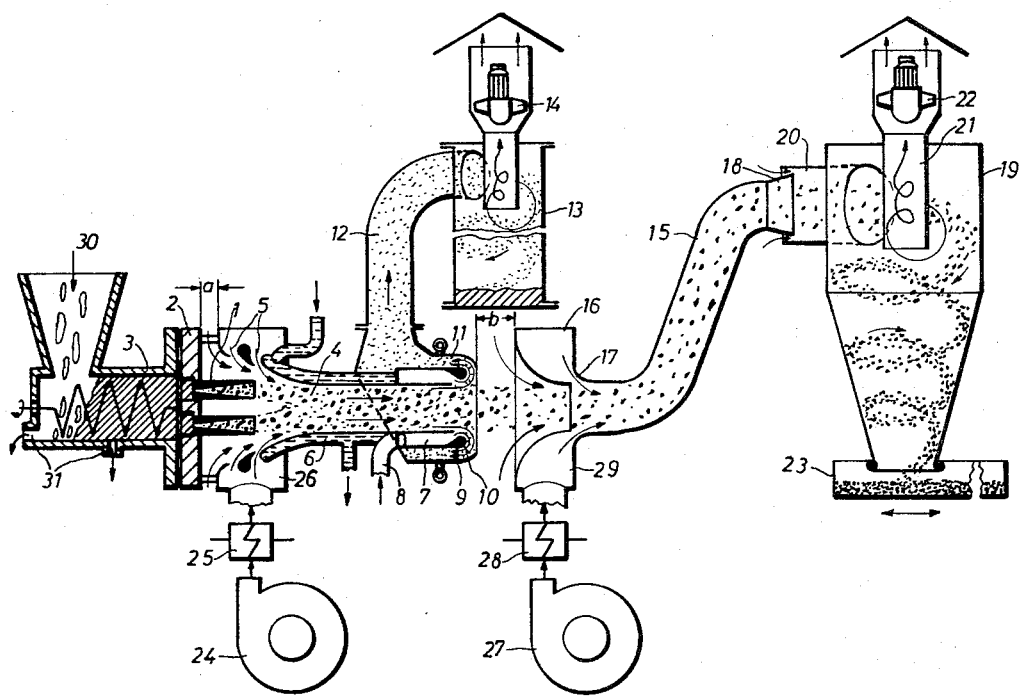

3,370,358
PROCESS AND APPARATUS FOR WORKING
UP RUBBER
Paul Esser, Leverkusen, Heinz Gröne, Leverkusen-Steinbuchel, Edgar Muschelknautz, Leverkusen, and August-Peter Weiss, Dormagen-Horrem, Germany, assignors to Farbenfabriken Bayer Aktiengesellschaft, Leverkusen, Germany, a corporation of Germany
Filed Mar. 4, 1966, Ser. No. 531,998
Claims priority, application Germany, Apr. 17, 1965,
F 45,841
12 Claims. (Cl. 34—10)

ABSTRACT OF THE DISCLOSURE

Process and apparatus for drying comminuted rubbers by subjecting the wet rubber to the action of an extruder whereby compressing water out of the mass, entraining the rubbery particles in cool air surrounded by a cooled surface whereby the zone through which the entrained rubber passes is surrounded by water, separating the cool air from the rubber, re-entraining the rubbery particles in warm air whereby additional water is removed, and separating the warm air from the rubber. The apparatus comprises a screw extruder, a cooled conduit, and a second conduit in stream-aligned relationship together with appropriate feed, separating, and product collection means.

---

It is known to use screw extruders for drying synthetic rubber. In this known process the water content of the rubber, which is about 50%, is mechanically reduced to somewhere between 6 and 15% in an expressing screw and about half the water which then remains is squeezed out at elevated pressure, also mechanically, in a second machine or stage which may be combined with the first. The remaining water is then evaporated by the so-called expansion process. In this process, the moist material is raised to a pressure of 30 to 100 atmospheres gauge and a temperature of 150 to 230° C. in the second machine and extruded through narrow nozzles with simultaneous releases of pressure. As the pressure is released, most of the water enclosed in the rubber evaporates explosively and the rubber is broken down into small, open-celled spongy lumps and is cooled to about 100° C. by the evaporating water. In the known processes and apparatus, the rubber particles projected out of the nozzles are trapped in a larger chamber, the so-called hot box, which is arranged behind the nozzle plate and above a vibratory conveyor, and the particles then drop on to the conveyor to be carried to a weighing machine and bale press. Hot air is blown into the hot box to absorb and carry away the steam which is formed from the water contained in the rubber. On the conveyor system, which is partly heated, the rubber lumps must stay for 2 to 3 minutes so that the water still adhering to them (about 1 to 1.5%) can evaporate and the rubber can cool to about 60° C. The rubber, pressed into bales and ready for general delivery, must not contain more than about 0.5% water or liquid constituents.

Heating of the moist material is effected mainly by friction and rolling in the second screw and partly also by supply of heat through the wall of the apparatus. The water expressed mechanically in the second screw extruder can be discharged at the back or through apertures at the side. Part of this water, however, is not discharged but carried on in the rubber material in the form of relatively large bubbles occluded in rubber particles. This water will no longer mix with the rubber material but is driven out through the nozzles, together with the rubber. At the low temperatures of 150 to 200° C. which prevail at the nozzle, only a small part of this water can evaporate. It is consequently either blown out in a finely atomised form or, under less favourable conditions, it flows as an intermittent stream from the nozzle.

This is the reason why these nozzles operate very unevenly. Where a nozzle plate having a large number of individual nozzles is used, rubber lumps, steam and water droplets are blown at a high speed through most of the individual nozzles. From time to time, only water and steam leave through the nozzles, again at a high speed, and in some cases thick, elongated strands of rubber torn open in a spongy form are slowly extruded from one or more nozzles either only from time to time or continuously. Most of the lumps have about the same size as the nozzle apertures (2–6 mm. diameter or cruciform nozzles with the same aperture areas) or are blown up to about twice that size by steam; a considerable proportion, which experience has shown to increase with increasing rate of feed and increasing temperature in the screw, consists of smaller particles down to about 0.1 mm., and a proportion, usually very small, is powdered (<0.1 mm.).

In the chamber set up behind the nozzle plate, most of the lumps hit against the walls. The larger particles bound back and fall down, the small particles and especially the pulverulent particles adhere and within a short time get stuck to the walls. They then agglomerate to form thick, firmly adhering accretions which have to be removed by hand at frequent intervals. The air blown into the chamber carries away a large proportion of the fine particles and the pulverulent portion as it leaves the chamber. Consequently, thick deposits are also formed in the discharge apparatus, and these deposits have to be removed from time to time. These deposits may amount to as much as 5% of the total output. They are usually still so moist that they have to be separated, cut up and dried again. If water is discharged through some of the nozzles, it comes into contact with the deposits on the walls. Water is also included in the layer of rubber lumps on the vibratory conveyor, which layer is usually 5 to 10 cm. thick. Such water inclusions are clearly visible in the completely pressed bales. In unfavourable cases, up to 10% of all bales have water inclusions or inclusions of excessively moist rubber and have to be separated and worked up again.

In spite of these difficulties, expansion drying has advantages over the conventional drying in band driers, the main advantages being low cost of plant and low operating costs.

It is also possible to dry rubber by evaporating the water in screw extruders. For this operation it is necessary to use two-shaft extruders with evaporator dome. The evaporator dome is usually connected to a vacuum pump so that the water can evaporate at relatively low temperatures. The extruders are less efficient, much more expensive and much more liable to mechanical defects. In addition, the labour involved is greater than in apparatus used in expansion drying. The rubber is already dry in the last part of the two-shaft extruders and is exposed to greater mechanical stress there than the moist material in the expansion extruder. It is also very difficult to keep the evaporator dome free from wall deposits. Rubber adhering to the hot wall of the evaporator dome quickly becomes degraded and perishes. It frequently happens that such wall deposits become torn off by rubber strands slung round them and are pulled back into the screw and included in the finished rubber. Such inclusions can completely ruin finished rubber and are particularly unpleasant because they can often only be detected during subsequent working up processes.

In cases where brief heating to 150 to 200° C. is permissible, it is therefore most suitable, cheapest and simplest to dry the rubber in expansion screw extruders and accept the disadvantages described above. There is therefore a demand for improving the expansion drying process so that the rubber can be separated as quickly as possible from the steam and water droplets without risk of sticking and wall deposits.

Object of this invention therefore is a process for drying water bearing materials—especially synthetic rubbery polymers—which comprises introducing such material into a screw extruder for compression thereby to extract a first fraction of their water content, feeding the partially dehydrated material product from said screw extruder into a first air stream guided by a cooled medium to further dehydrate said material by condensate extraction of their water content partly as liquid and partly as vapor and feeding the dehydrated material product into a second air stream, said second air stream being heated to convert a further portion of the remaining water content of said material into superheated steam for extraction as such and discharging the dehydrated material product from said second air stream.

More specifically it has been found that synthetic rubber polymers may be dried if the mixture of rubber, water and steam leaving the nozzles of the expansion screw extruder is collected in a short cooled conveyor tube and is carried forward at high speed by a blast of cold or warm air and the air is then sharply deflected at the end of the conveyor tube and sucked off and the rubber particles flying out of the tube are collected in a second, longer conveyor tube, blown by hot air to a cyclone which has an open exit for material, separated there from the air stream and carried away on a vibratory conveyor and the air is completely removed by suction from the immersion tube of the cyclone.

A further object of the invention is an apparatus for drying water bearing materials which comprises a screw extruder means disposed to receive water bearing materials and operable to compress and comminute same to extract a first portion of the water content thereof, a first extraction means disposed to receive said partially dehydrated comminuted materials from said extruder means and to introduce same into an absorbent carrier gas stream to remove a portion of the remaining water content of said materials as vapor, said first extraction means including a cooled conduit for guiding the flow of said carrier gas and materials and for condensing said vapor for removal as liquid therefrom and a gas separator means disposed for separating the comminuted materials from said carrier gas and a second extraction means disposed to receive said additionally dehydrated comminuted materials from said first extraction means and to introduce same into a heated carrier gas stream to remove a further portion of the remaining water content of said materials as superheated vapor, said second extraction means including a separator means for separating said superheated vapor from the ultimate dehydrated comminuted material product.

More specifically an apparatus for carrying out the process according to the invention is shown in FIG. 1. It consists essentially of long, conically expanding nozzles 1 mounted on the nozzle plate 2 of a conventional single-shaft screw extruder 3, a short straight or slightly curved conveyor tube 4 with one or more air injection slots 5 arranged behind one another in the conically tapered inlet, a cooling jacket 6 and a known toroidal deflecting device, at the end of the tube, which deflecting device consists of annular chamber 7, tangential air inlet 8, ejector slot 9, toroidal beading 10 and suction hood 11 and is connected through the suction pipe 12 to the cyclone 13 (closed at the bottom) and suction fan 14. It further consists of a second, longer conveyor tube 15 with inlet hopper 16, one or more air injection slots 17 and a diffuser 18 as well as a cyclone 19 which is open at the bottom and has an open inlet connection 20, the immersion tube 21 of which is connected to a suction fan 22, and of an elongated vibratory conveyor 23.

According to the invention, the short conveyor tube 4 is arranged in the extension of the axis of the screw extruder 3 at a slight distance $a$ from the nozzle plate 2 of the extruder so that air from the surroundings can be sucked into the conveyor tube without significant flow resistance. The nozzles 1 extend into the conveyor tube 4 as far as the air ejection slots 5. The longer conveyor tube 15 (in the figure it has two curvatures) is arranged with its inlet hopper 16 coaxial with the conveyor tube 4 and at a larger distance $b$ from it so that the suction hood 11, which is made in one piece or of several parts, can easily be opened for cleaning while the apparatus is in operation and air can be sucked from the surroundings into the conveyor tube 15. A fan 24 pushes air through the air heater 25, which should supply sufficient heat to heat the air up to about 50° C., into the annular chamber 26 and through the slots 5 into the conveyor tube 4. The connecting tube opens tangentially into the annular chamber 26 or is provided at its end with a deflector plate which causes rotation of the air in the chamber 26 and in the slots 5. A second fan 27 pushes air which can be heated in the heater 28 to about 125° C. into the annular chamber 29 and through the slot 17 into the conveyor tube 15.

If the conventional short nozzles are used, part of the rubber is torn open by the steam only after leaving the nozzles, particles being flung in all directions and even to the nozzle plate at the back. In the long, conically expanding nozzles, the ends of which can be cut off obliquely to the axis of the extruder, the stream of rubber, water and steam is concentrated fairly efficiently and backflow of particles is substantially prevented. The few particles still sprayed backwards after leaving the nozzles are quickly stopped by the air sucked into the conveyor tube from the surroundings and the air flowing past the nozzles and are carried along by this air. Condensed steam and droplets blown out of the nozzles hit against the cooled wall of the tube and keep it moist. The wall of the tube should have a very smooth surface and in some cases it is advantageous to coat the surface with a coating of material which has only slight adhesion to rubber, such as polytetrafluoroethylene, silicone rubber and the like. The fine particles of rubber adhere only slightly to the moist and possibly lined wall. The air flowing at high speed out of the slots 5 which is at the same time rotating, takes with it, above all, the large lumps and strands slowly falling out of the nozzles and accelerates then along ever widening spiral paths along the wall. Fine particles, which in spite of the water film adhere loosely to the wall, are thus rapidly detached again and the wall remains completely clean. The rotation is used up by wall friction after only a short path. At the end of the conveyor tube 4, all the particles fly practically in the direction of flow. Due to the high air velocity in the conveyor tube 4 combined with the powerful turbulence, jets of water which occasionally issue from the nozzles or large droplets are rapidly atomised to a fine state of subdivision. The air sharply deflected at the end of the tube takes up practically all the water droplets and the powder-fine rubber particles of a size of 0.1 mm. and carries them into the suction conduit and to the cyclone 13 where they are deposited. The cyclone has a diameter of preferably 2 to 5 times, most preferably 3 to 3.5 times and a height of preferably 5 to 10, most preferably 7 to 8 times the diameter of the conveyor tube 15. The open discharge aperture for material as well as the open inlet connections should have about ½ to ⅓ of the cyclone diameter and the separator chamber should be preferably taped downward at a cone angle of 15 to 30°. The conveyor tube 4, the suction hood 11, conveyor tube 15 and cyclone 19 may in a preferred embodiment be coated on the inside with a coating which has only slight adhesion to rubber.

Suitable coatings are for example made from polytetrafluoroethylene, silicone rubber and similar material. Deposits formed in the suction hood 11 can easily be removed in the course of operation. In the suction conduit 12, an appreciable deposit builds up only after several days. The conveying air from the conveyor tube 4 gets deflected even when the hood is open, although in that case some of the air then flows into the surroundings.

In a preferred mode of operation the rubber is processed in a screw extruder and expands through long, conically expanded nozzles into a conveyor tube which is 0.5 to 5 and preferably 1 to 2 m. in length, the wall of the conveyor tube is externally cooled with cooling salt solution or water at −15 to +15° C., the rubber is conveyed with 0.5 to 5 and preferably 1 to 2 kg. of air per kg. of rubber at air temperatures between 14 and 40° C., preferably 20 to 30° C., and at air velocities of between 15 and 100, preferably between 30 and 50 m./s., the conveying air is then sharply deflected through 180° at constant velocity, the radii of curvature of the flow lines being between 20 and 100 mm., and this air is removed by suction, the rubber is collected in a second conveyor tube and is blown into a cyclone with 0.5 to 5, preferably 1 to 2 kg. of air per kg. of rubber at air temperatures between 40 and 100° C., preferably between 50 and 70° C., at air velocities of 20 to 80, preferably 30 to 40 m./s., the air is removed by suction from the cyclone and the rubber is discharged onto the vibratory conveyor.

The process according to the invention divides the drying operation into several sections. This will now be explained again with reference to the apparatus described. In the first part of the apparatus, as far as the toroidal beading 10 of the deflector and separator, the rubber particles are carried through a cooled tube which has wet walls which may even have a coating of ice. The cooling jacket of this tube is supplied with cooling water or cooling salt solution, the temperature being generally maintained between +15 and −15° C. However, it is also possible to use colder salt solutions of temperatures down to about −50° C., which gives good results but at the expense of economy. The rubber particles do not remain adhered to the wet or iced walls. The air velocity in the tube is of the order of about 30 to 100 m./sec. so that the small particles of the diameter of about 1 to 0.1 mm. are practically accelerated to the velocity of this air stream while the velocity of the larger rubber particles remains far below this. The smaller particles therefore fly past the larger particles and are to a large extent deposited on the larger particles. The proportion of dust-fine rubber particles is thus greatly reduced. In the process of separation of the gases and rubber particles in the region of the toroidal beading 10 of the deflector and separator, the conveying air, steam, atomised water and residue of the very finest rubber particles (about 0.5% of the total quantity) are separated, about half the total quantity of water still remaining in the rubber being removed, so that cold rubber particles which are relatively uniform in size and which do not include any particles of rubber dust enter the conveyor tube 15. These rubber particles of rubber dust enter the conveyor tube 15. These rubber particles can be dried with hot air. Wall deposits and accretions do not occur because these particles have sufficient kinetic energy to prevent firm adhesion to the wall.

The advantages of this process are obvious. Although greater expenditure in apparatus is required than in the known processes, trouble-free and continuous operation of the process over long periods is ensured. The frequent cleaning of the apparatus after a short time in operation is no longer necessary and the rubber material can no longer be spoilt by inclusions of water or burnt rubber particles.

The process is particularly suitable for drying rubber that becomes very sticky on heating. Its advantages are particularly apparent when working up poly-1,4-cis-butadiene. Working up this material is therefore the main field of application of the process.

*Example*

2.5 tons per hour of cis-polybutadiene having a water content of 12% are raised to a temperature of 170° C. and a pressure of 50 atmospheres gauge in a single-shaft screw 3 of 10 inches diameter and 300 H.P. driving power, and are released through 12 nozzles each of which have a diameter of 3 mm. in the narrowest part and expand to a diameter of 15 mm. over a length of 125 mm. 140 l./h. of water expressed from the rubber is discharged from the apertures 31 of the screw 3. The conveyor tube 4, lined on the inside with polytetrafluorethylene, has a length of 125 cm., a diameter of 175 mm. and is arranged at a distance of 75 mm. in front of the nozzle plate 2. 2000 m.³/h. of air at a temperature of 20° C. are blown in at normal pressure at an axial velocity of 80 m./s. and circumferential velocity of 60 m./s. through the slots 5 which have a width of 6 mm. and diameter of 180 and 190 mm. A further 1500 m.³/h. of air, also at a temperature of about 20° C., is thus sucked in from the surroundings. About 1.5 m.³/h. of water flows through the cooling jacket 6 at a temperature of 12° C. at the inlet and 13° C. at the outlet. Most of the nozzles discharge lumps of a size of 0.1 to about 5 mm. at velocities of up to 40 m./s. as well as steam and water droplets less than 1 mm. in size. From a few nozzles, rubber strands torn open to expose a spongy consistency, which strands are up to 10 cm. in length and 5 to 10 mm. in diameter are occasionally extruded slowly at speeds of about 1 m./s. One or two nozzles expel for short periods a mixture of water, steam and a small quantity of fine rubber particles. 350 Nm.³/h. of compressed air are supplied through the tube 8 at a temperature of 20° C. and pressure of 0.35 atmospheres gauge. This air flows at a circumferential velocity of about 120 m./s. and axial velocity of 100 m./s. out of the slot 9 through the toroid 10 which has a radius of curvature of 30 mm. The annular area between suction hood 11 and toroid 10 is equal to the cross-sectional area of the conveyor tube. About 4000 m.³/h. of air are removed by suction by the fan 14. This air carries with it about 10 kg./h. of dust fine, moist rubber particles as well as most of the water droplets. The rubber is almost completely separated in a cyclone which has a diameter of 750 mm. and height of 1500 mm.; this rubber is fairly moist and must be worked up again. The conveyor tube 15, which is lined with siloprene, is 10 m. long and has a diameter of 200 mm. 2500 m.³/h. of air at 80° C. are blown at the rate of 100 m./s. through the slot 17, so that about 1000 m.³/h. of air are sucked in from the surroundings. The conveyor tube has two curvatures each of 90° and each of 150 cm. radius of curvature.

The diffuser 18 has an opening angle of 10° and ends in the double tubular cross-section. The cyclone 19 is 1.50 m. high and has a diameter of 0.75 m. The separator chamber tapers at a cone angle of 30° to the open discharge aperture for material, which aperture has a diameter of 350 mm. The open inlet connection which is 500 mm. long and the immersion tube extending into it, which tube is 500 mm. long have each a diameter of 275 mm. The cyclone lets about 10 kg./h. of dry rubber particles of a size of 0.1 to about 2 mm. be carried away with the waste air, and these particles are collected in a second cyclone. This quantity is also worked up again. The rubber is carried on a 12 m. long and 0.5 m. wide vibratory channel lined with siloprene to the weighing machine and baling press at a rate of 8 m./min. At the exit of the cyclone, it has a temperature of 80 to 85° C. and contains about 1% water, and at the end of the vibratory conveyor it is at a temperature of 60° C. and contains 0.4% water. The pressed bales have no water inclusions whatever. The quantity that has to be worked up a second time is less than 1% of the whole output.

We claim:

1. Process of drying rubbery water-bearing materials which comprises compressing said material whereby a portion of said water is removed; ejecting said partially dehydrated material in comminuted form through pressure release means; propelling said comminuted material with a cool fluid through a cooled zone whereby a portion of the water content of said material is condensed; separating said cool fluid and said comminuted material; propelling said additionally partially dehydrated comminuted material with a warm fluid through an ambient temperature zone whereby further water is removed from said material; and separating said comminuted material from said warm propelling fluid.

2. Process as claimed in claim 1, wherein said material is polycis-butadiene.

3. Process as claimed in claim 1, wherein said warm and said cool fluid are both air.

4. Process as claimed in claim 1, wherein said cooled zone is cooled with a cooling fluid and maintained at a temperature of about minus 15° C.

5. Process as claimed in claim 3, wherein said air is fed to said cooled conduit tangentially at a point upstream from the point of injection of said partially dehydrated material.

6. Process as claimed in claim 1, wherein the downstream end of said cooled conduit is provided with suction means whereby condensed water is extracted therefrom.

7. Apparatus which comprises a screw extruder having at least one pressure reducing ejection nozzle extruding from the downstream portion thereof; means for feeding a water-bearing material to said extruder; means for compressing said water-bearing material in said extruder; a cooled conduit operatively associated and axially aligned with said nozzle; means for introducing a cooled fluid into said conduit such that the flow of said fluid is substantially in the same direction as the major ejection direction of said nozzle; a second conduit operatively associated with said cooled conduit such that efflux from said cooled conduit enters said second conduit; means for introducing a warmed fluid into said second conduit such that the flow of said fluid is substantially in the same direction as the direction of entry of the efflux of said cooled conduit; and means operatively associated with said second conduit for separating said fluid from said material.

8. Apparatus as claimed in claim 7, wherein both of said fluids are air and wherein said separating means is a cyclone.

9. Apparatus as claimed in claim 7, wherein said cooled conduit contains a toroidal deflecting device at the downstream end thereof, and said cooled conduit is about 0.5 to 5 meters long.

10. Process as claimed in claim 1, including externally cooling said cooled zone whereby to form a water layer surrounding said cool, fluid-comminuted material mixture.

11. Process as claimed in claim 1, wherein said materials are comminuted, synthetic, rubbery polymers.

12. Process as claimed in claim 1, wherein said materials are tacky, comminuted, synthetic, rubbery polymers; said fluids are both air; and said cooled zone is externally cooled whereby to form a layer of water surrounding said cool, fluid-comminuted material mixture.

References Cited

UNITED STATES PATENTS

| | | | |
|---|---|---|---|
| 3,241,246 | 3/1966 | Pollock | 34—10 |
| 3,280,472 | 10/1966 | Lorenian | 34—10 |
| 3,293,771 | 12/1966 | Lawrence et al. | 34—57 |

JAMES W. WESTHAVER, *Primary Examiner.*

JOHN J. CAMBY, *Examiner.*

UNITED STATES PATENT OFFICE
CERTIFICATE OF CORRECTION

Patent No. 3,370,358                                      February 27, 1968

Paul Esser et al.

It is certified that error appears in the above identified patent and that said Letters Patent are hereby corrected as shown below:

Column 1, line 53, "stem" should read -- steam --. Column 3, lines 21 and 22, "rubber" should read -- rubbery --. Column 5, lines 60 and 61, cancel "These rubber particles of rubber dust enter the conveyor tube 15.".

Signed and sealed this 25th day of November 1969.

(SEAL)
Attest:

Edward M. Fletcher, Jr.                          WILLIAM E. SCHUYLER, JR.
Attesting Officer                                        Commissioner of Patents